E. B. EVENSON.
PLOW ATTACHMENT.
APPLICATION FILED FEB. 8, 1912.

1,074,422.

Patented Sept. 30, 1913.
2 SHEETS—SHEET 1.

Witnesses

Inventor
E. B. Evenson.
By
Attorney

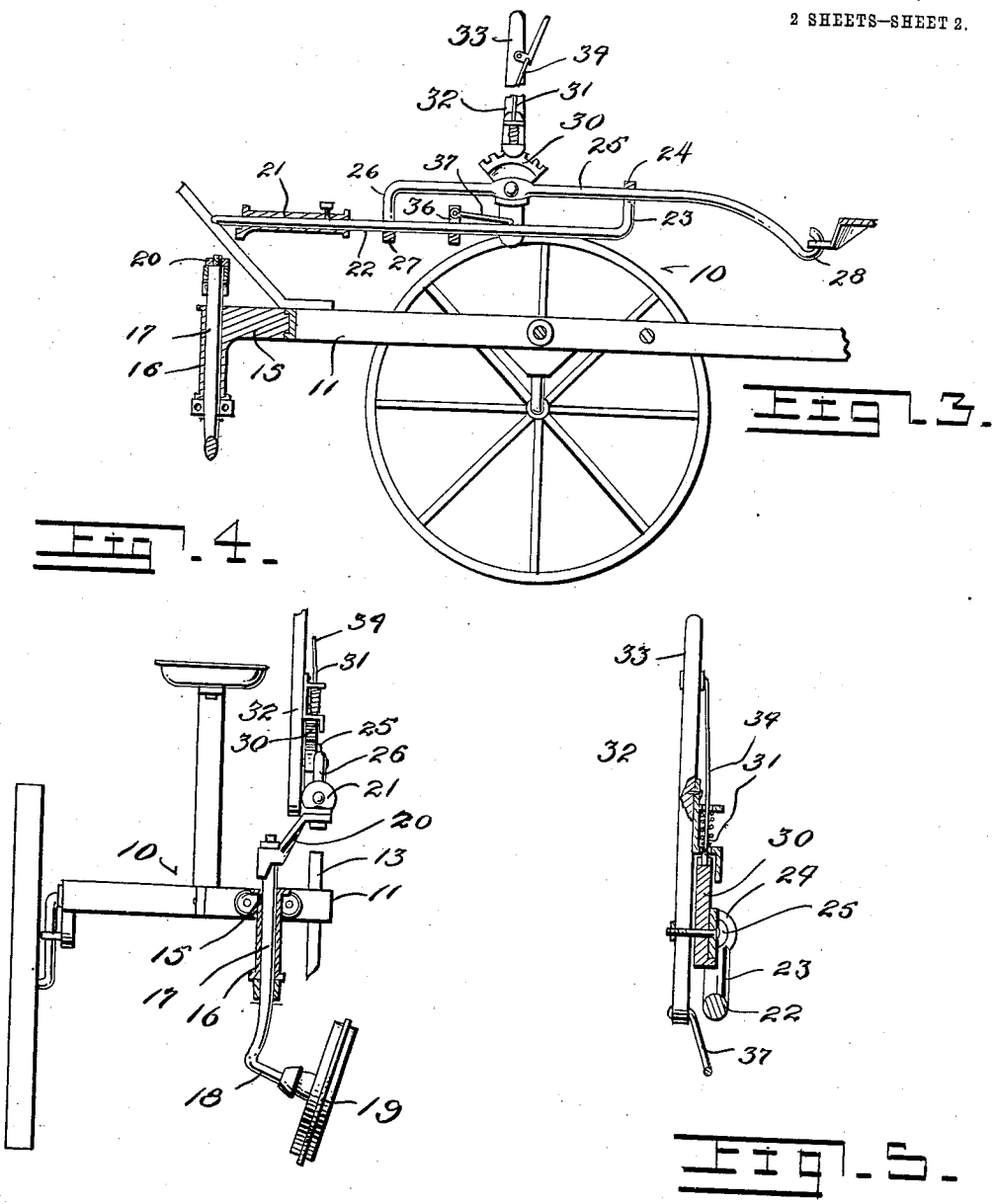

UNITED STATES PATENT OFFICE.

EDWARD B. EVENSON, OF COLFAX, WISCONSIN.

PLOW ATTACHMENT.

1,074,422.  Specification of Letters Patent.  Patented Sept. 30, 1913.

Application filed February 8, 1912. Serial No. 676,186.

*To all whom it may concern:*

Be it known that I, EDWARD B. EVENSON, a citizen of the United States, residing at Colfax, in the county of Dunn, State of Wisconsin, have invented certain new and useful Improvements in Plow Attachments; and I do hereby declare the following to be a full, clear, and exact description of the invention, such as will enable others skilled in the art to which it appertains to make and use the same.

This invention relates to new and useful improvements in plow attachments, and while the same is described as being applied to a sulky plow it should be understood that the same can be used in connection with a plow of any other nature or in fact with any other machines to which the various parts of the attachments will adapt themselves.

Considerable difficulty has been heretofore experienced in plowing the hill sides due to the fact that unless the rear furrow wheel is arranged at a proper angle with respect to the ground the plow will slide laterally with respect to the furrow.

The object of this invention is the provision of a plow attachment which will overcome this difficulty by providing a means for the quick and efficient adjustment of the said furrow wheel.

A further object of this invention is to improve and simplify devices of this character, rendering them comparatively simple and inexpensive to manufacture, reliable and efficient in use and readily operated.

Figure 1:
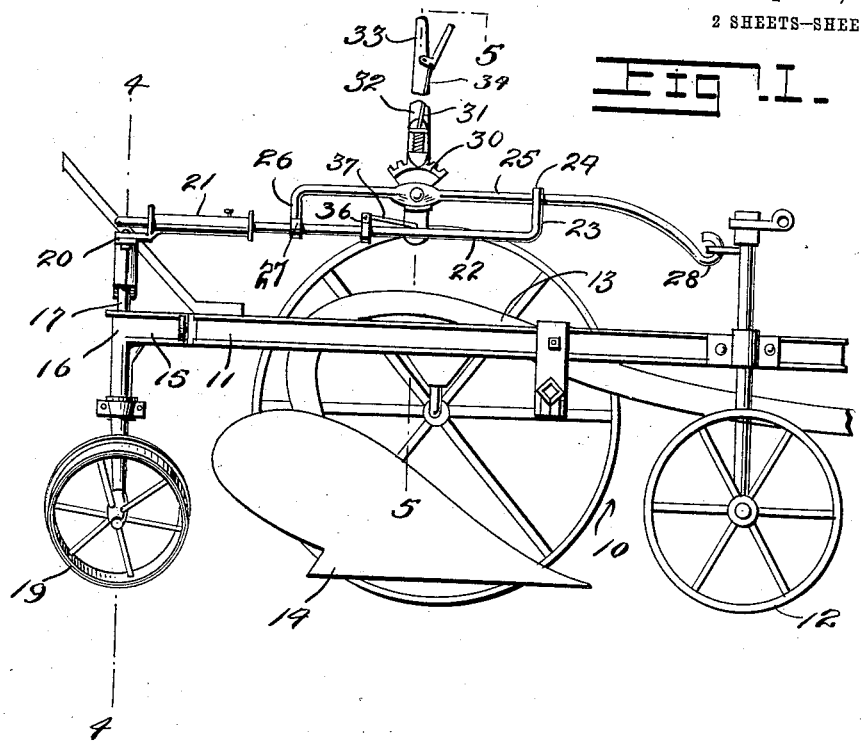
Figure 2:
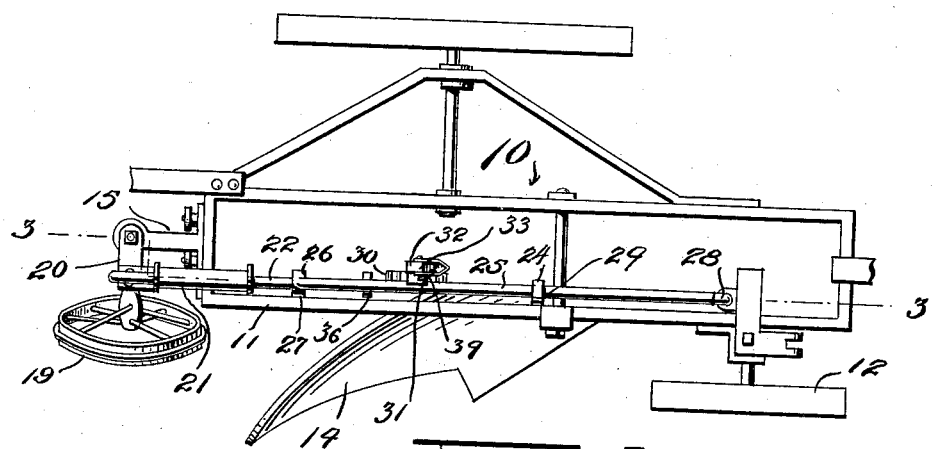

With the above and other objects in view, this invention resides in the novel features of construction, formations, combinations and arrangements of parts to be hereinafter more fully described, claimed and illustrated in the accompanying drawings, in which:

Figure 1 is a side elevation of my invention. Fig. 2 is a top plan view thereof. Fig. 3 is a longitudinal sectional view thereof on the line 3—3 of Fig. 1. Fig. 4 is a transverse sectional view taken on the line 4—4 of Fig. 1, and Fig. 5 is a similar view taken on the line 5—5 of Fig. 1.

Referring to the accompanying drawings by similar characters of reference throughout the several views, the numeral 10 designates generally a sulky plow of the usual construction comprising the usual frame bar 11 which carries the supporting wheels 12 and plow standard 13 which has secured to its lower extremity a plow share 14. A bracket 15 is secured to the upper extremity of the plow frame bar 11 and has formed thereon a vertical bearing 16 in which is located a shaft 17, the lower terminal of which is off-set as at 18 and supports the rear furrow wheel 19 in such manner that upon the rotation of the shaft 17 the angle of the furrow wheel 19 will be changed. A laterally extending arm 20 projects from the upper terminal of the shaft 17 and is pivotally secured to a longitudinally extending attaching sleeve 21 in which is adjustably held an operating rod 22. The forward end of the operating rod 22 is off-set as at 23 and formed with an eye 24 which slidably receives a rod 25, which like the rod 22 is off-set as at 26 at its rear extremity and provided with an eye 27 which surrounds the said rod 22 and supports these rods 22 and 25 adjustably with respect to each other. The forward terminal of the rod 25 is attached as indicated by the numeral 28 to the forward end of the frame bar 11, while secured to this said rod 25 is a toothed segment 30 arranged for engagement with a spring actuated locking pawl 31 supported upon the lower end of a lever 32 and operated through the medium of a hand grip 33 and connecting rod 34. The lever 32 is pivotally connected to the rod 25 and holds the latter against any undesired movement only permitting in its operation the longitudinal movement of the rod 22. A clip 36 is adjustably clamped upon the rod 22 and is connected to the lower end of the lever 34 by a link 37, which upon the operation of the lever 32 causes the swinging of the arm 20 which rotates the said shaft 17 causing the tilting of the furrow wheel 19 to any desired position relative to the plow or the ground.

From the foregoing disclosures taken in connection with the accompanying drawings it will be manifest that a plow attachment of the nature described is provided which will fulfil all of the necessary requirements of such a device. It should be understood in this connection that various minor changes in the details of construction may be resorted to within the scope of the appended claim without departing from or sacrificing any of the advantages of the invention.

Having thus fully described this invention what I claim as new and desire to protect by Letters Patent, is:

Operating means for the control of the adjustment of the wheels in a side-hill plow, said means including a pair of coacting rods, eyes formed upon the ends of said rods for the engagement of the adjacent rods, an operating lever and a link connecting operating lever with one of said rods, and means carried by one of said rods for adjustable connection with one of the wheels of said plow.

In testimony whereof, I affix my signature, in presence of two witnesses.

EDWARD B. EVENSON.

Witnesses:
 HENRY B. ANDERSON,
 J. H. OLSEN.

Copies of this patent may be obtained for five cents each, by addressing the "Commissioner of Patents, Washington, D. C."